US006532693B2

(12) United States Patent
Sides

(10) Patent No.: US 6,532,693 B2
(45) Date of Patent: Mar. 18, 2003

(54) DECOY SYSTEM

(76) Inventor: Mark Sides, 68 Arundel, St. Louis, MO (US) 63105

(*) Notice: Subject to any disclaimer, the term of this patent is extended or adjusted under 35 U.S.C. 154(b) by 0 days.

(21) Appl. No.: 09/781,471

(22) Filed: Feb. 12, 2001

(65) Prior Publication Data

US 2002/0108289 A1 Aug. 15, 2002

(51) Int. Cl.[7] .......... A01M 31/06
(52) U.S. Cl. .......... 43/2
(58) Field of Search .......... 43/2, 3; 446/220, 446/223, 226

(56) References Cited

U.S. PATENT DOCUMENTS

| | | | | | |
|---|---|---|---|---|---|
| 836,823 | A | * | 11/1906 | Oliver et al. | 43/3 |
| 2,838,872 | A | * | 6/1958 | Beck | 446/226 |
| 2,916,849 | A | * | 12/1959 | Lemelson | 446/226 |
| 3,800,457 | A | * | 4/1974 | Barrett | 43/3 |
| 3,916,553 | A | * | 11/1975 | Lynch et al. | 43/3 |
| 4,062,141 | A | * | 12/1977 | Shjeflo | 43/3 |
| 4,611,421 | A | * | 9/1986 | Jacob | 43/3 |
| 4,651,457 | A | * | 3/1987 | Nelson et al. | 43/3 |
| 4,773,178 | A | * | 9/1988 | Marek | 43/2 |
| 4,821,444 | A | * | 4/1989 | Remus | 43/2 |
| 4,852,288 | A | * | 8/1989 | Payne et al. | 43/2 |
| 5,036,614 | A | * | 8/1991 | Jackson | 43/3 |
| 5,172,506 | A | * | 12/1992 | Tiley et al. | 43/3 |
| 5,335,436 | A | * | 8/1994 | Gurr | 446/226 |
| 5,459,958 | A | * | 10/1995 | Reinke | 43/2 |
| 5,515,637 | A | * | 5/1996 | Johnson | 43/2 |
| 5,522,168 | A | * | 6/1996 | Friddle | 43/2 |
| 5,546,692 | A | * | 8/1996 | Byers | 43/2 |
| 5,632,110 | A | * | 5/1997 | Roy | 43/2 |
| 5,682,701 | A | | 11/1997 | Gammon | |
| 5,791,081 | A | * | 8/1998 | Turner et al. | 43/2 |
| 5,797,208 | A | * | 8/1998 | Lessa | 43/2 |
| 5,826,364 | A | * | 10/1998 | Bitting | 43/2 |
| 5,884,427 | A | * | 3/1999 | Lenz | 43/2 |
| 5,943,807 | A | * | 8/1999 | McPherson | 43/2 |
| 5,983,552 | A | * | 11/1999 | Nelson | 43/2 |
| 6,021,594 | A | * | 2/2000 | Krueger | 43/2 |
| 6,070,356 | A | * | 6/2000 | Brint et al. | 43/2 |
| 6,079,139 | A | | 6/2000 | Berry | |
| 6,092,322 | A | * | 7/2000 | Samaras | 43/2 |
| 6,266,912 | B1 | * | 7/2001 | Jirele | 43/2 |

FOREIGN PATENT DOCUMENTS

| | | | | | |
|---|---|---|---|---|---|
| CA | 2047568 | A1 | * | 1/1993 | 43/2 |
| GB | 1385023 | A1 | * | 2/1975 | |
| GB | 2230171 | A1 | * | 10/1990 | |

* cited by examiner

*Primary Examiner*—Darren W. Ark
(74) *Attorney, Agent, or Firm*—Armstrong Teasdale LLP

(57) ABSTRACT

A decoy system includes an inflatable decoy including an outer wall forming a sealed inner chamber and an inflation valve extending from the outer wall. The decoy system further includes a mounting rod system rotatably supporting the decoy. The decoy is supported by the mounting rod system such that the decoy can freely rotate without contacting a mounting surface. The decoy system also includes a motor and a moveable section extending from the outer wall and connected to the motor. The motor moves the moveable section upon actuation of the motor.

17 Claims, 5 Drawing Sheets

DECOY SYSTEM

BACKGROUND OF THE INVENTION

This invention relates generally to imitation animal structures, and, more particularly, to animal decoys utilized to attract animals.

Typically it is common to utilize a decoy when hunting certain types of game, for example, ducks and geese. However, the use of decoys is limited due to practical considerations, such as a size of the decoy, and potential danger involved with transporting the decoy to the appropriate location. For this reason, one common type of decoy is an inflatable decoy that is inflated after arriving at the hunting location. Unfortunately, inflatable decoys do not always provide a realistic appearance since they are usually securely anchored to the ground or to an object, and as such, they remain fixed where positioned.

It would be desirable to provide a realistic looking decoy that is easily transportable and is capable of movement while the decoy is mounted to a mounting surface.

BRIEF SUMMARY OF THE INVENTION

In accordance with one embodiment of the invention, a decoy system is capable of movement and includes an inflatable decoy and a mounting system. The inflatable decoy includes an outer wall forming a sealed inner chamber and an inflation valve extending from the outer wall. The mounting system rotatably supports the decoy such that the decoy can freely rotate without contacting a mounting surface. The decoy system also includes a motor and a moveable section extending from the outer wall and connected to the motor. The motor moves the moveable section upon actuation of the motor.

More particularly, and in one embodiment, the decoy is a deer decoy mounted on a rod such that the decoy does not contact the ground. The decoy is thus able to rotate about the rod as a result of exposure to wind. In addition, the motor is mounted to a tail section so that the tail of the decoy is moveable upon actuation of the motor. A scent pad is mounted on the decoy such that scent is released from the scent pad, and thus the decoy.

The above described decoy system provides an easy to transport decoy that can be inflated and set up at a particular location in little time. The decoy moves to provide a realistic appearance and includes a moveable tail section for further realism.

DETAILED DESCRIPTION OF THE INVENTION

Figure 1:
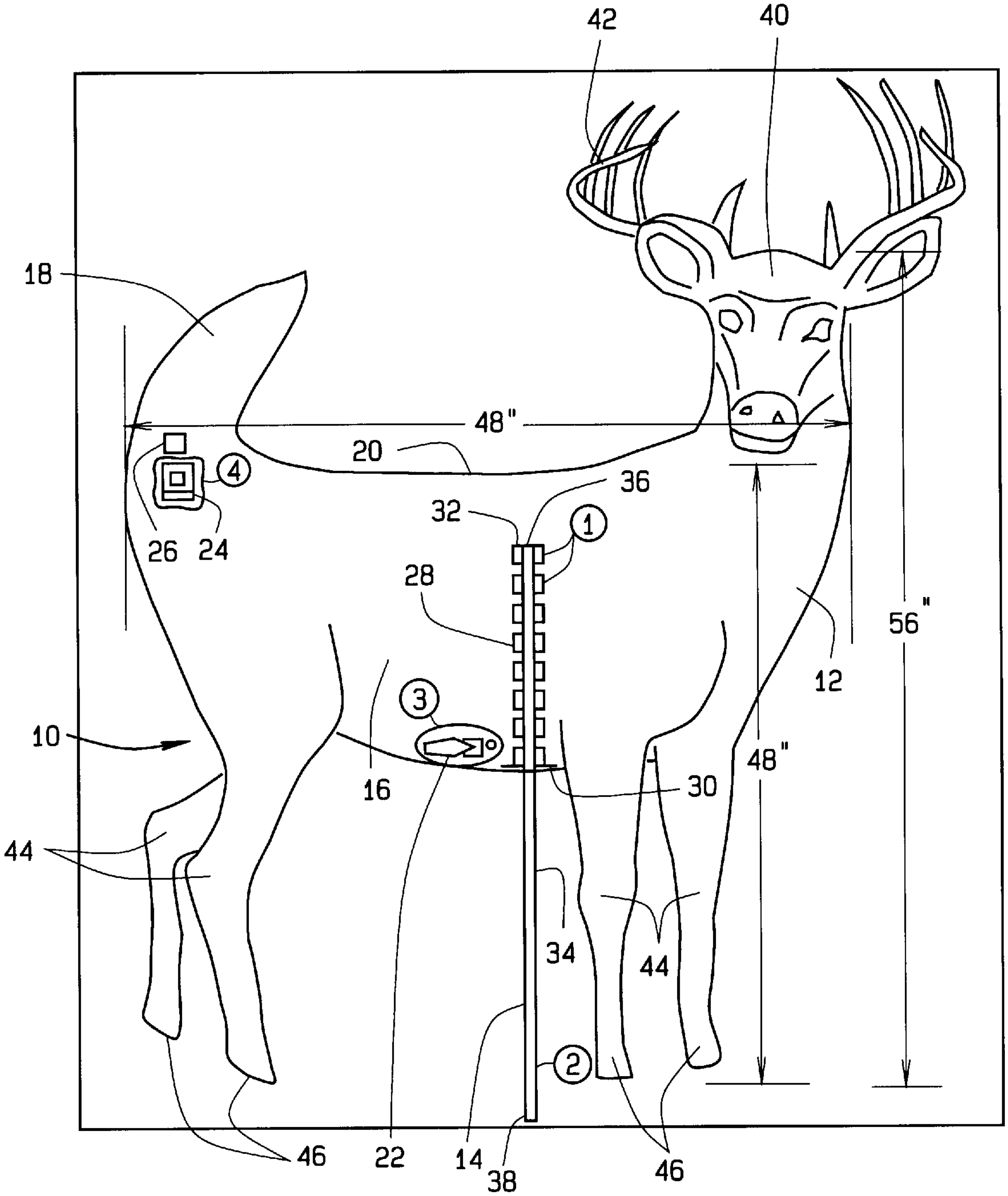
FIG. 1 is schematic view of a decoy system in accordance with one embodiment of the present invention.

FIG. 1 is a schematic view of a decoy system 10 including a decoy 12 and a mounting system 14. Decoy 12 includes a body portion 16 and a moveable tail 18 extending from body portion 16. Body portion 16 includes an outer wall 20 forming an air tight, inflatable, sealed inner chamber (not shown). In one embodiment, body portion 16 is fabricated from a PVC-backed nylon sheeting. Alternatively, body portion 16 is fabricated from any other durable material that can form an air tight chamber. An inflation valve 22 extends into the inner chamber from outer wall 20 and is in fluid communication with the inner chamber. In a further embodiment, body portion 16 includes a deflation valve (not shown) extending into the inner chamber from outer wall 20. The deflation valve is in fluid communication with the inner chamber and is utilized to deflate the inner chamber.

Decoy 12 also includes a motor 24 connected to tail 18 such that motor 24 moves tail 18 upon actuation of motor 24. In one embodiment, the attachment of motor 24 to tail 18 is similar to the attachment of animation motors to figures. In one embodiment, tail 18 is fluidly connected to the body portion inner chamber. In an alternative embodiment, tail 18 is detachable from decoy 12. In a further alternative embodiment, tail 18 includes a stiffening member (not shown) that extends substantially the length of tail 18. The stiffening member is attached to the actuation member and provides for movement of tail 18 upon movement of the actuation member. In one embodiment, decoy 12 includes a scent pad 26 located in close proximity to tail 18, as described below in greater detail.

Mounting system 14 includes a tubular insert 28 extending into body portion 16. In one embodiment, tubular insert 28 extends into the inner chamber of body portion 16. Tubular insert 28 is fabricated from a pliable material such as nylon sheeting. Alternatively, tubular insert 28 is fabricated from a rigid material such as plastic or metal. Tubular insert 28 includes an open first end 30 and a closed second end 32. Mounting system 14 also includes a rod 34 having a first end 36 and a second end 38. Rod first end 36 extends within tubular insert 28 and rotatably supports body portion 12 with respect to a mounting surface (not shown). Rod second end 38 engages the mounting surface. In one embodiment, the mounting surface is the ground and rod second end 38 is inserted into the ground. In an alternative embodiment, the mounting surface is a hardened surface, such as concrete, and rod second end 38 fits within a base member (not shown) that maintains rod second end 38 in a fixed position on the mounting surface and supports decoy 12. In a further embodiment, rod 34 is a collapsible rod including multiple segments held together with a stretchable cord. In a still further embodiment, rod 34 is a collapsible rod including coaxial telescopic segments. In yet another embodiment, rod 34 is a unitary member.

As shown in FIG. 1, decoy 12 is a deer decoy that includes a head 40 with antlers 42 extending therefrom, legs 44 and feet 46. In a further embodiment, a second motor is mounted near head 40 and moves head 40 upon actuation of the second motor. Although decoy 12 is illustrated as a deer in FIG. 1, it is to be understood that decoy 12 could be any type of animal or even a human.

In use, decoy 12 is inflated using an inflation device, such as a $CO_2$ canister. Mounting rod second end 38 is inserted into the ground and tubular insert 28 is positioned over rod first end 36 until rod first end 36 contacts tubular insert second end 32. Rod 34 is positioned such that decoy 12, including feet 46, is spaced a distance from the ground allowing decoy 12 to rotate about rod 34 upon application of an external force, such as the wind.

Figure 2:
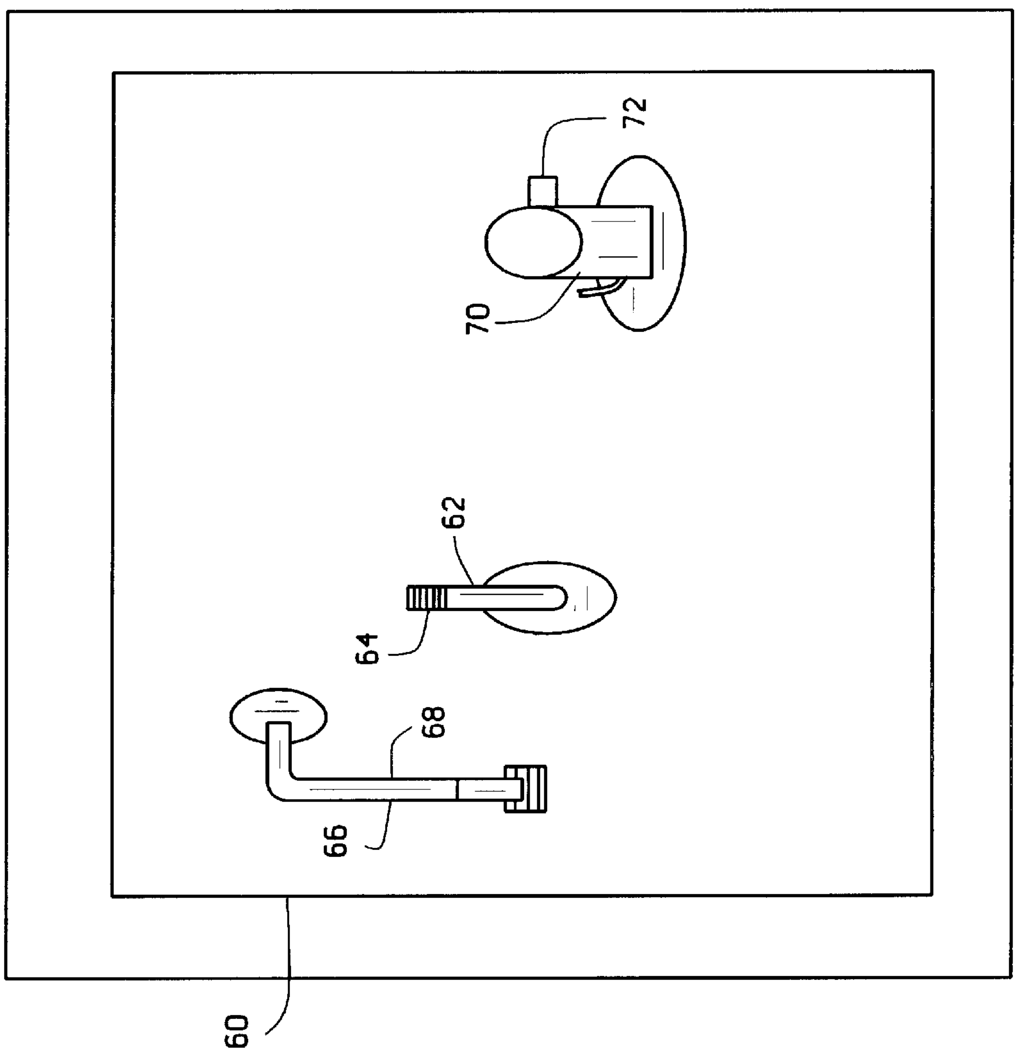
FIG. 2 is an enlarged view of an inflation section on the decoy shown in FIG. 1.

FIG. 2 is an enlarged view of an inflation section 60 on decoy 12 (not shown). Inflation section 60 includes a first inflation valve 62 configured to engage an inflation device, e.g., a pump (not shown). First inflation valve 62 includes a threaded portion 64 including a valve core (not shown). First inflation valve 62 is known in the art and is similar to a tire inflation valve assembly. Inflation section 60 also includes a second inflation valve 66 configured to be inflated orally. Second inflation valve 66 includes a smooth bore stem 68 connected to a valve (not shown). Second inflation valve 66 is known in the art and is similar to inflation valves included on items such as beach balls and water rafts. Second inflation valve 66 also serves as a deflation valve to release air pressure from decoy 12. Air is released through second inflation valve 66 by opening valve 66 and allowing air to escape. Inflation section 60 further includes a third inflation valve 70 configured to engage an inflation device such as a $CO_2$ canister (shown in FIG. 3). Third inflation valve 70 includes an adapter having a size and shape to mate with an air expelling portion of the canister. Although inflation section 60 is shown as including first inflation valve 62, second inflation valve 66, and third inflation valve 70, it is to be understood that inflation section 60 could include any combination of inflation valves 62, 66, and 70.

Figure 3:
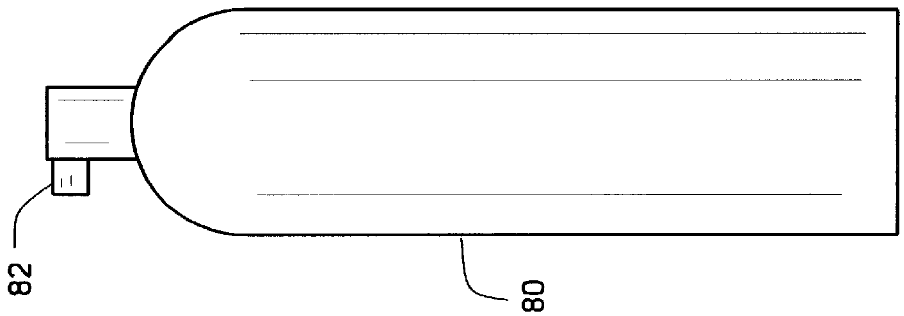
FIG. 3 is a schematic view of an air canister configured for use with a $CO_2$ inflation valve on the decoy shown in FIG. 1.

FIG. 3 is a schematic view of an air canister 80 configured for use with a $CO_2$ inflation valve such as third inflation valve 70 shown in FIG. 2, on decoy 12 (shown in FIG. 1). Canister 80 includes an air expelling portion 82 that mates with third inflation valve 70. In one embodiment, canister 80 is a $CO_2$ canister containing approximately 90 pounds per square inch (psi) as is known in the art.

Figure 4:
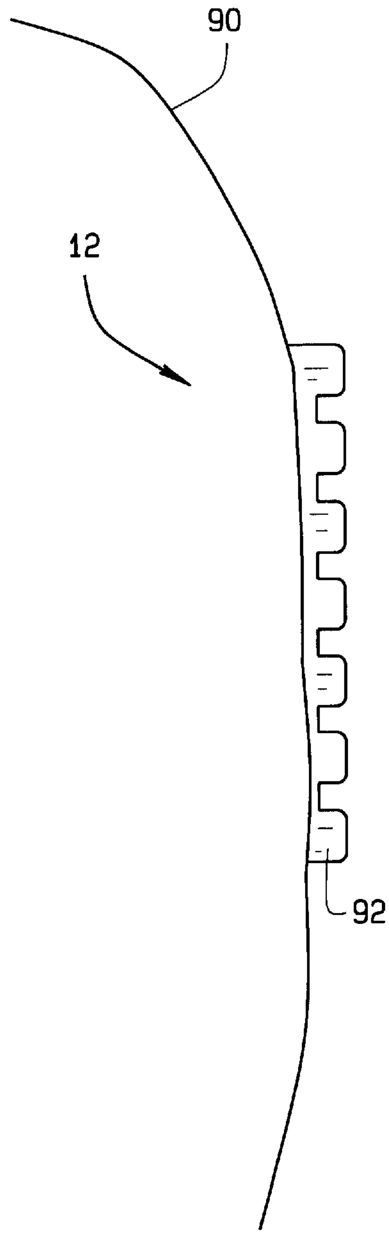
FIG. 4 is an enlarged schematic view of a rear portion of the decoy shown in FIG. 1.

FIG. 4 is an enlarged schematic view of a rear portion 90 of decoy 12. Rear portion 90 includes an attachment section 92 fabricated from a hook and pile attachment material. In an alternative embodiment, attachment section 92 is fabricated from a material easily adhered to. In a further alternative embodiment, attachment section 92 includes one or more of fasteners, snaps, buttons, and thread.

Figure 5:
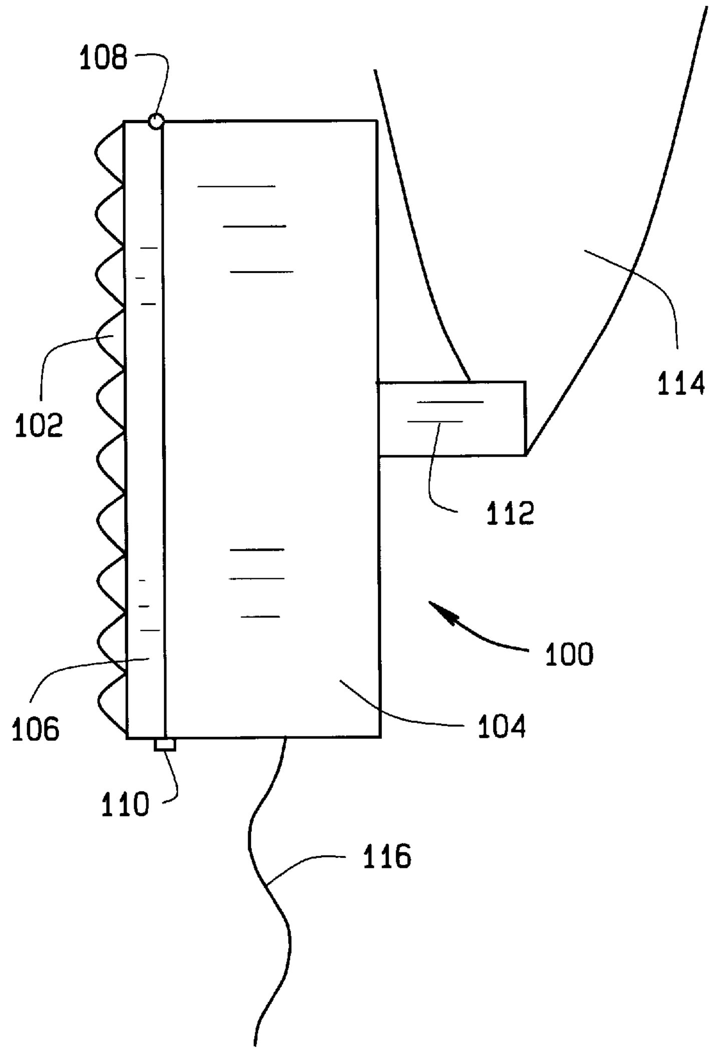
FIG. 5 is a schematic view of a tail section configured for attachment to the rear portion shown in FIG. 4.

FIG. 5 is a schematic view of a tail section 100 configured for attachment to rear portion 90 (shown in FIG. 4). Tail section 100 includes, in one embodiment, an attachment area 102 fabricated from a hook and pile attachment material configured to mate with hook and pile attachment section 92 shown in FIG. 4. In an alternative embodiment, attachment area 102 includes one or more of fasteners, snaps, buttons, and thread to mate with attachment section 92. Tail section 100 also includes a motor (not shown) substantially contained within a housing 104. In one embodiment, attachment area 102 is affixed to a motor housing lid 106 attached to housing 104, such as by a hinge 108 and a pin 110. The motor includes a shaft 112 which is attached to a tail portion 114. In one embodiment, tail portion 114 is similar to tail 18 shown in FIG. 1. Tail section 100 also includes an antenna 116 connected to the motor for remote operation of the motor.

Figure 6:
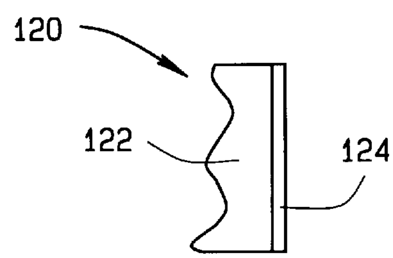
FIG. 6 is a schematic view of a scent section configured for attachment to the rear portion shown in FIG. 4.

FIG. 6 is a schematic view of a scent section 120 configured for attachment to rear portion 90 (shown in FIG. 4). Scent section 120 includes, in one embodiment, an attachment area 122 fabricated from a hook and pile attachment material configured to mate with hook and pile attachment section 92 shown in FIG. 4. In an alternative embodiment, attachment area 122 includes one or more of fasteners, snaps, buttons, and thread to mate with attachment section 92. Scent section 120 also includes a scent pad 124 affixed to attachment area 122. In one embodiment, scent pad 124 is similar to scent pad 26 shown in FIG. 1.

In use, scent section 120 is attached to decoy 12 (shown in FIG. 1) near tail portion 114 (shown in FIG. 5). In one embodiment, scent pad 124 is located adjacent moveable tail portion 114 and releases scent, such as by osmosis, after scent has been applied thereto. In an alternative embodiment, scent pad 124 is mounted to tail portion 114 such that when the motor is actuated and moves tail portion 114, scent is released from scent pad 124. Specifically, scent pad 124 is located on moveable tail portion 114 such that movement of tail portion 114 moves scent pad 124 through the air which releases the scent. In one embodiment, scent pad 124 includes buck urine as scent. In an alternative embodiment, scent pad 124 includes doe urine as scent. Scent pad 26 is attached to decoy 12 using a hook and pile fastener system. Alternatively, scent pad 26 is attached with one or more of adhesive, snaps, buttons, and thread.

Figure 7:
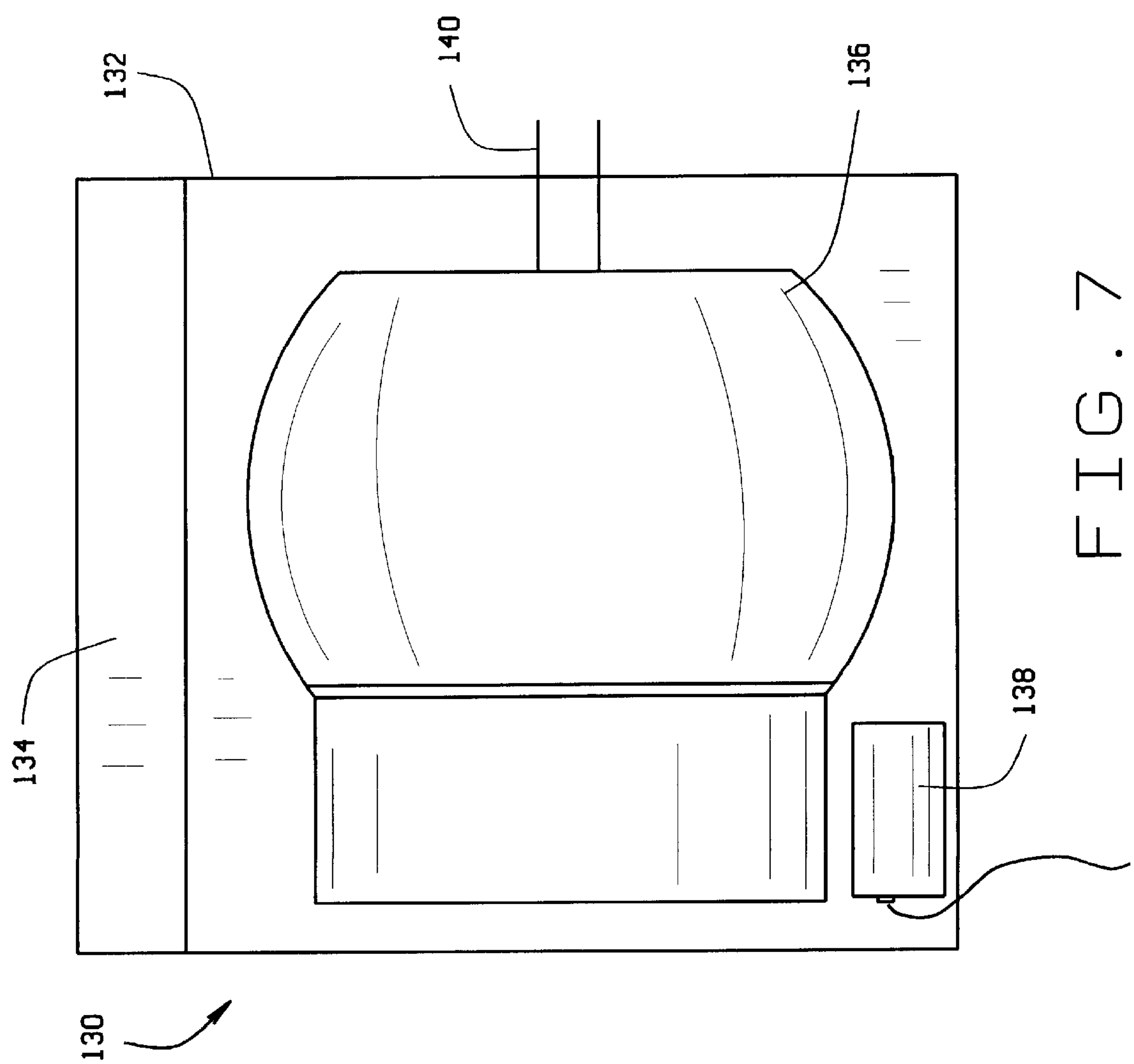
FIG. 7 is a schematic view of a motor assembly.

FIG. 7 is a schematic view of a motor assembly 130 including a housing 132, a battery 134, a motor 136 and a remote activation device 138. In one embodiment, motor housing 132 is the same as motor housing 104 shown in FIG. 5. Motor 130 includes a rotor shaft 140 connected to tail portion 114 (shown in FIG. 5). In one embodiment, motor 130 is well known in the art, such as for example, motors used for animation. Rotor shaft 140 is connected to tail portion 114 directly. In an alternative embodiment, rotor shaft 140 is connected to tail portion 114 with an actuation member (not shown) that motor 130 reciprocates or rotates. Battery 134 is, in one embodiment, a 12V battery and is electrically connected to motor 130. Remote activation device 138 includes an antenna 142 and is used to actuate motor 130 from a remote location. Remote activation of motors is well known in the art.

Figure 8:
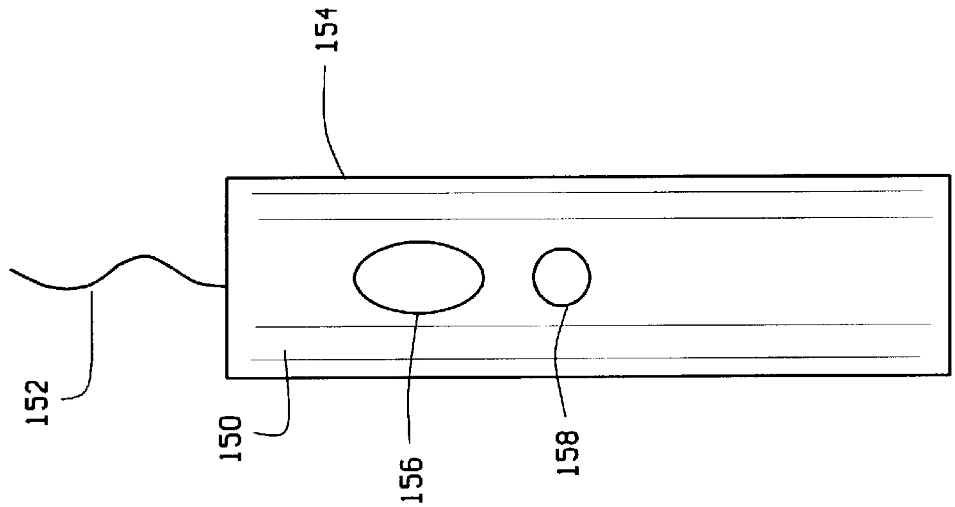
FIG. 8 is a schematic view of a remote activation device.

FIG. 8 is a schematic view of a remote activation device 150 including an antenna 152, a housing 154, a start button 156 and a stop button 158. Remote activation devices are well known in the art. Remote activation device 150 is utilized to activate motor 130 (shown in FIG. 7).

Figure 9:
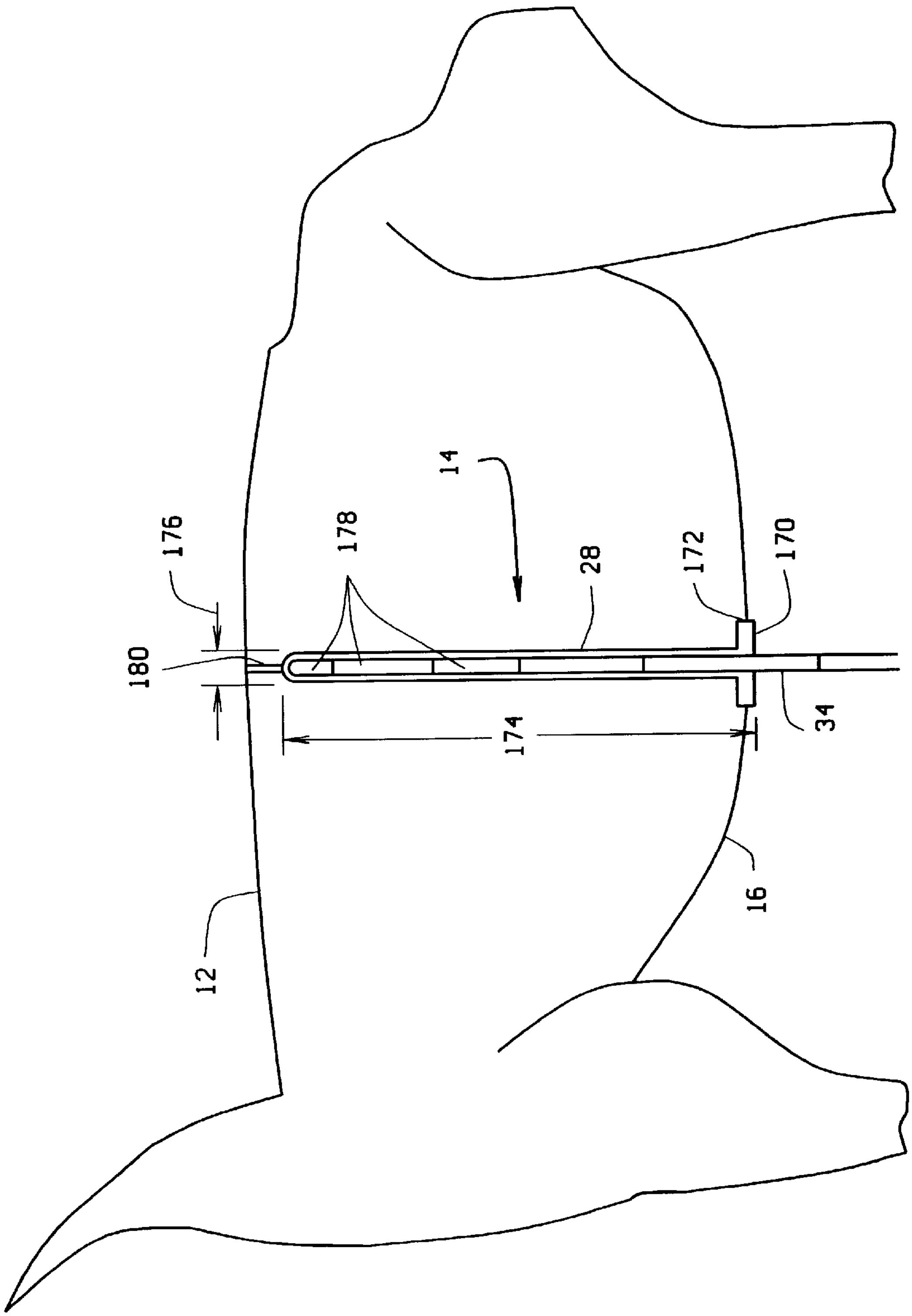
FIG. 9 is a partial cut-away section view of the decoy shown in FIG. 1 including the mounting system.

FIG. 9 is a partial cut-away sectional view of decoy 12 illustrating the attachment of mounting system 14 to decoy 12. Tubular insert 28 extends into an inner chamber of body portion 16. In the exemplary embodiment illustrated in FIG. 9, tubular insert 28 is fabricated from a rigid material such as plastic or metal. Tubular insert 28 is attached to body portion 16 with a collar 170. In one embodiment, collar 170 is fabricated from a substantially rigid plastic and is RF welded to a section 172 of body portion 16 adjacent collar 170. In an alternative embodiment, collar 170 is fabricated from a substantially pliable plastic. Collar 170 is RF welded in a balanced manner to body portion 16, which is fabricated from a pliable material such as vinyl or PVC. Tubular insert 28 has a length 174 and a diameter 176 which are sufficient to create a neutral balanced effect for the decoy when the decoy is mounted on rod 34. Rod 34 is fabricated, in the exemplary embodiment, from aluminum and includes a plurality of sections 178 held together by a stretchable cord (not shown) that runs the length of rod 34. In the exemplary embodiment, tubular insert second end 32 is attached to an upper portion of decoy body portion 16 with an attachment member 180. In an alternative embodiment, tubular insert second end 32 is not attached to body portion 16, and tubular insert 28 is attached to body portion 16 only at collar 170.

Decoy system 10 thus provides an easily transportable decoy that can be utilized for activities such as hunting. Since the decoy can be inflated and deflated and the mounting rod is collapsible, the entire decoy system can be transported to and from locations in a compacted state. In addition, the mounting of the decoy on a single rod allows the decoy to rotate about the rod thus creating a movement of the decoy that at times will appear to be natural.

While the invention has been described in terms of various specific embodiments, those skilled in the art will recognize that the invention can be practiced with modification within the spirit and scope of the claims.

What is claimed is:

1. A decoy system comprising:

an inflatable decoy comprising an outer wall forming a sealed inner chamber and an inflation valve in fluid communication with the inner chamber, said decoy further comprising a body portion, a moveable portion extending from a rear portion of said body portion, and a motor connected to said moveable portion, said motor configured to move said moveable portion upon actuation of said motor; and a mounting system rotatably supporting said decoy, wherein said mounting system further comprises:

a tubular insert extending into said body portion; and a rod with a first end and a second end, said rod first end extending within said tubular insert, said rod second end configured to engage a mounting surface, said decoy comprising one of a deer decoy, an elk decoy, a moose decoy, an antelope decoy, or a caribou decoy.

2. A decoy system in accordance with claim 1 wherein said tubular insert extends into said sealed inner chamber.

3. A decoy system in accordance with claim 1 wherein said rod comprises a collapsible rod.

4. A decoy system in accordance with claim 3 wherein said collapsible rod is configured to engage said mounting surface such that said outer wall does not contact the mounting surface.

5. A decoy system in accordance with claim 1 wherein said inflation valve comprises a threaded portion configured to engage an inflation device.

6. A decoy system in accordance with claim 1 wherein said decoy inflation valve further comprises an end configured to mate with an air canister.

7. A decoy system in accordance with claim 1 further comprising a deflation valve extending into said inner chamber.

8. A decoy system in accordance with claim 1 wherein said moveable portion is detachable from said outer wall.

9. A decoy system in accordance with claim 1 wherein said outer wall comprises a hook and pile attachment section.

10. A decoy system in accordance with claim 9 wherein said moveable portion comprises a hook and pile attachment section for attachment to said hook and pile attachment section on said outer wall.

11. A decoy system in accordance with claim 1 wherein said moveable portion comprises a tail section, said motor configured to move said tail section upon actuation of said motor.

12. A decoy system in accordance with claim 1 wherein said decoy further comprises a scent section attached to said outer wall.

13. A decoy system in accordance with claim 12 wherein said outer wall comprises a hook and pile attachment section.

14. A decoy system in accordance with claim 13 wherein said scent section comprises a hook and pile attachment section for attachment to said hook and pile attachment section on said outer wall and a scent pad.

15. A decoy system in accordance with claim 12 wherein said scent section is configured to release scent.

16. A decoy system in accordance with claim 1 wherein said decoy comprises feet.

17. A decoy system in accordance with claim 16 wherein said feet are spaced from the mounting surface when said body portion is supported by said mounting system.

* * * * *